April 7, 1964    F. L. CHRISTENSEN    3,127,715
DIAMOND CUTTING DEVICES

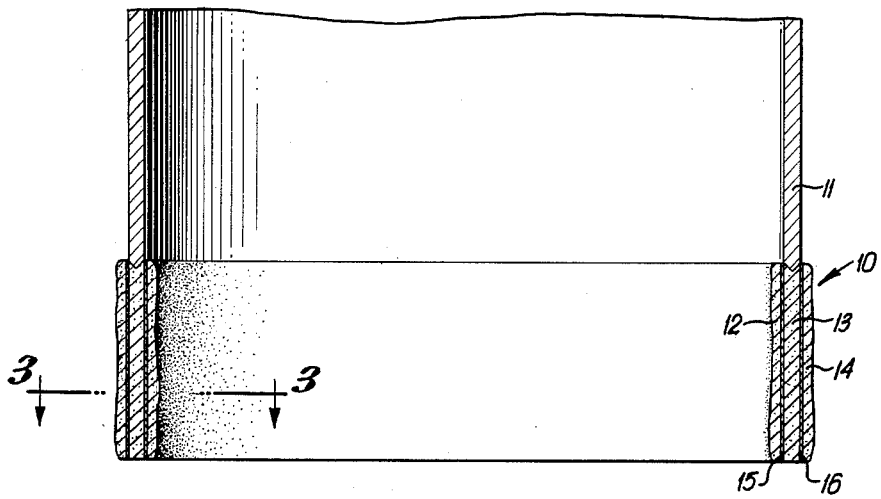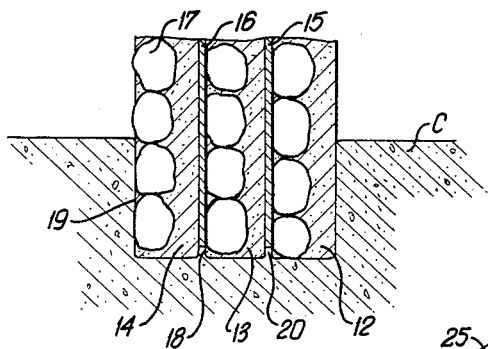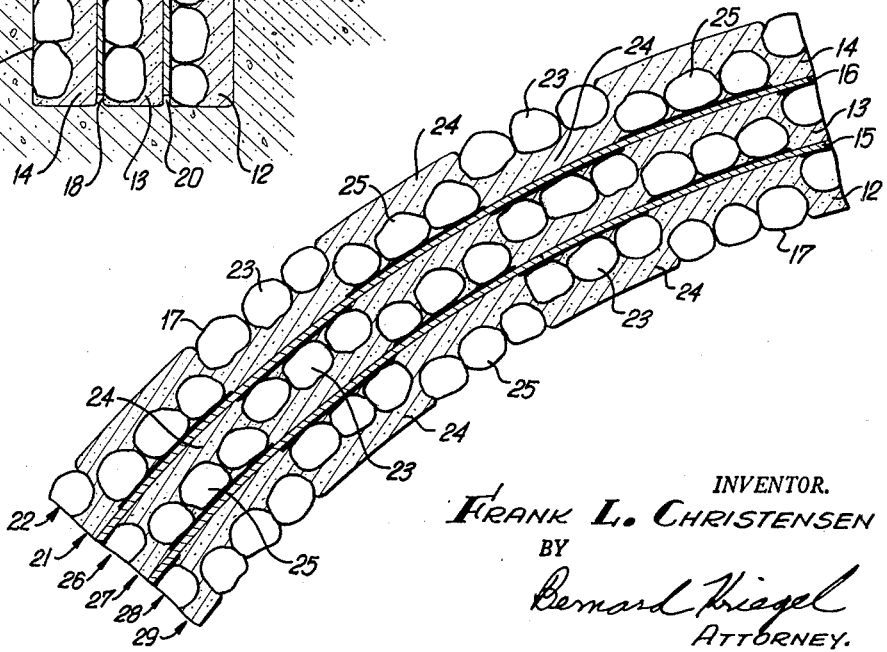

Filed April 27, 1960    5 Sheets-Sheet 2

INVENTOR.
FRANK L. CHRISTENSEN
BY
Bernard Kriegel
ATTORNEY.

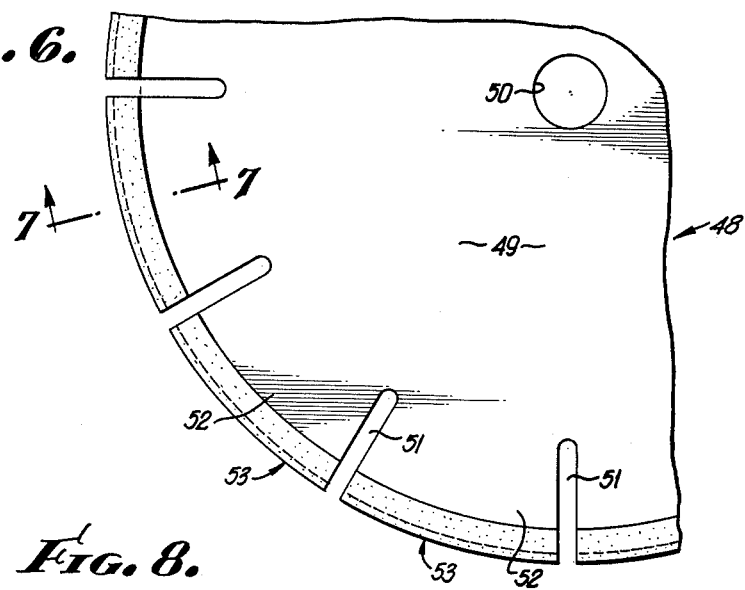
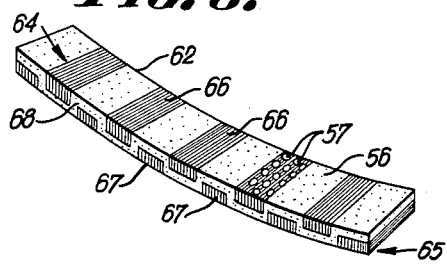
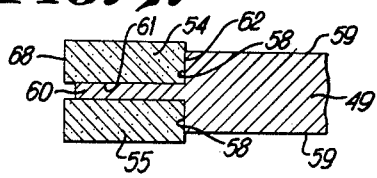
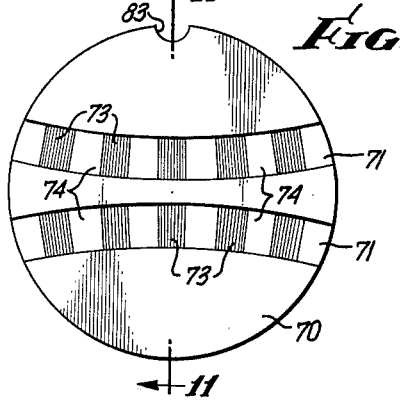
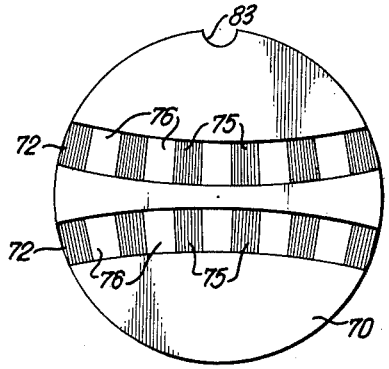
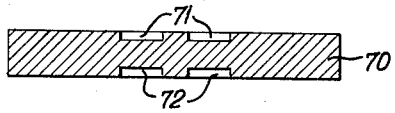
INVENTOR.
FRANK L. CHRISTENSEN
BY
Bernard Kriegel
ATTORNEY.

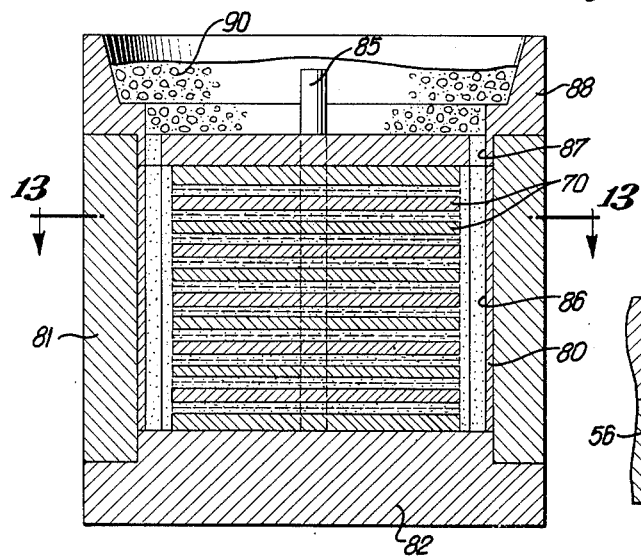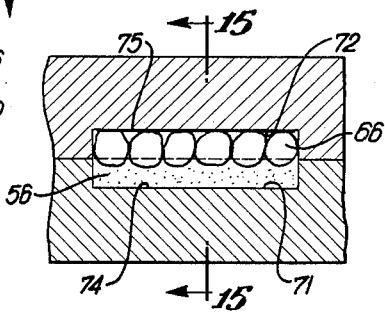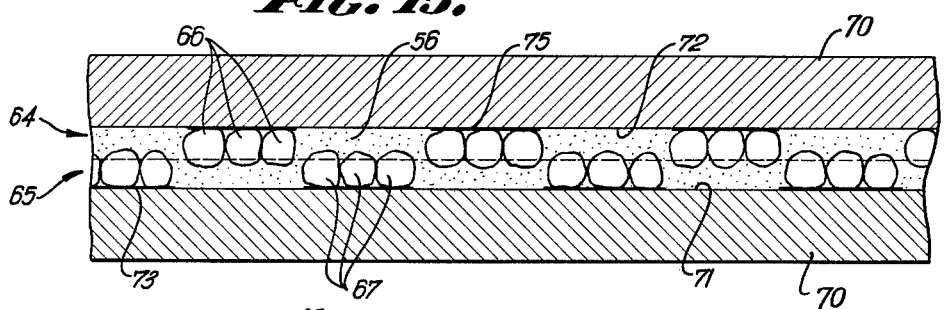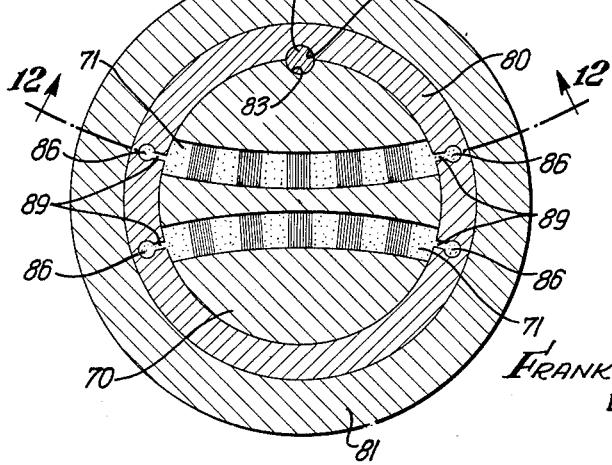

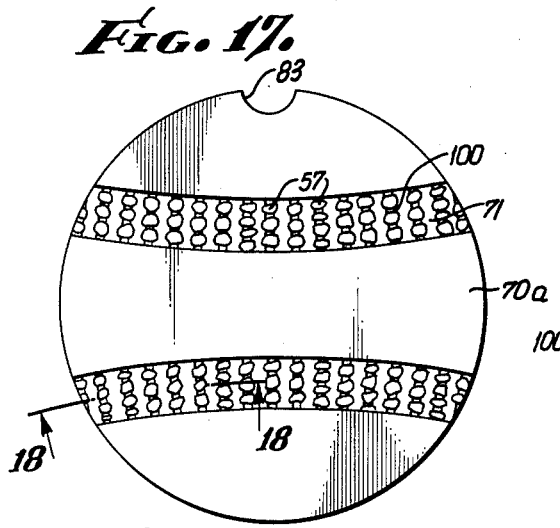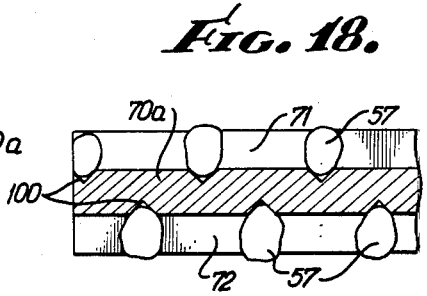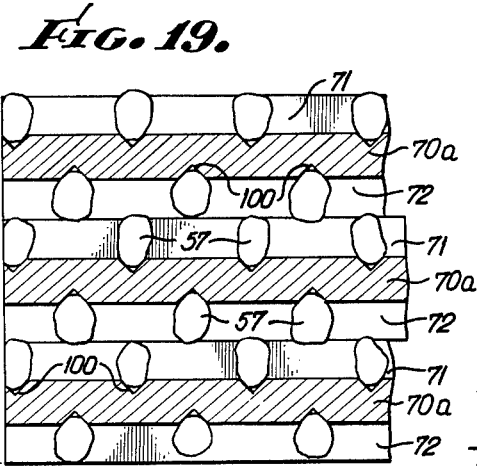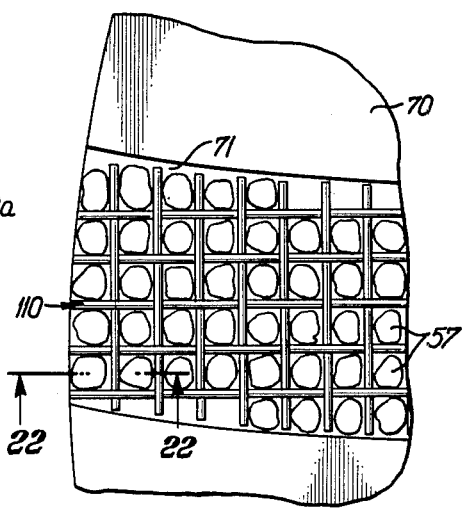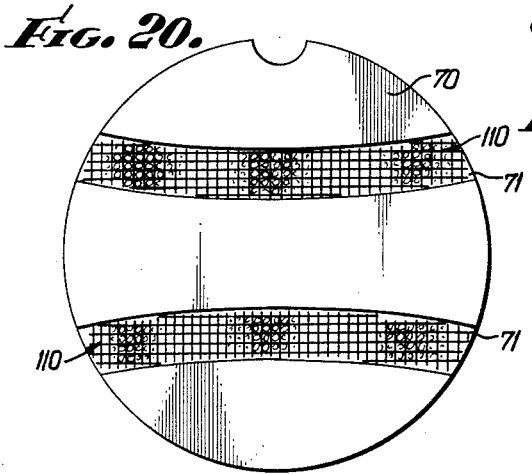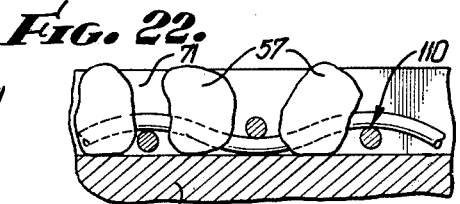

United States Patent Office 3,127,715
Patented Apr. 7, 1964

**3,127,715
DIAMOND CUTTING DEVICES**
Frank L. Christensen, Salt Lake City, Utah, assignor to Christensen Diamond Products Company, Salt Lake City, Utah, a corporation of Utah
Filed Apr. 27, 1960, Ser. No. 24,993
16 Claims. (Cl. 51—206)

The present invention relates to cutting devices, and more particularly to cutting devices employing diamonds as primary cutting elements.

Impregnated types of cutting devices, such as those in which diamonds are embedded in a suitable matrix, oftentimes have a comparatively short working life, due in large part to the lack of proper diamond distribution in the matrix. Whereas, it is desirable to have a substantially uniform distribution of diamonds in the matrix for most effective performance of the cutting devices, prior structures have not achieved this end. Instead, the diamonds have been clustered in parts of the matrix in haphazard fashion, large portions of the matrix even being devoid of diamonds. As a result, clustered diamonds are oftentimes improperly retained in the matrix and will be dislodged therefrom while the cutting device is being used. Where no diamonds are present in the matrix, the latter will wear away at a relatively rapid rate, requiring early discarding of the cutting device.

An object of the present invention is to provide an impregnated type of diamond cutting device having proper distribution of the diamond cutting elements in the matrix.

Another object of the invention is to provide an impregnated type of diamond cutting device in which all of the diamond cutting elements are firmly and properly embedded in the matrix, as well as being appropriately distributed through the matrix.

A further object of the invention is to provide a diamond cutting device capable of performing its cutting action effectively with a lesser number of diamonds embedded in the matrix of the cutting device.

An additional object of the invention is to provide a diamond cutting device capable of performing its cutting action at a faster rate and having a relatively longer useful life.

This invention possesses many other advantages, and has other objects which may be made more clearly apparent from a consideration of several forms in which it may be embodied. Such forms are shown in the drawings accompanying and forming part of the present specification. These forms and methods of producing them will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through a cylindrical cutting device or bit embodying the invention;

FIG. 2 is an enlarged fragmentary longitudinal section through a portion of the crown of the bit shown in FIG. 1, cutting in concrete or corresponding work;

FIG. 3 is a greatly enlarged section taken along the line 3—3 of FIG. 1;

FIG. 6 is a plan view of a section of a diamond cutting wheel or saw, representing another embodiment of the invention;

FIG. 7 is an enlarged section taken along the line 7—7 on FIG. 6;

FIG. 8 is an isometric projection of one of the cutting segments mounted on the diamond cutting wheel or saw illustrated in FIGS. 6 and 7;

FIG. 9 is a top plan view of a wafer or disc used in the mold in producing one of the segments shown in FIG. 8;

FIG. 10 is a bottom plan view of one of the wafers or discs used in the mold in producing the segment illustrated in FIG. 8;

FIG. 11 is a section taken along the line 11—11 on FIG. 9;

FIG. 12 is a vertical section through a mold assembly in producing a plurality of diamond impregnated cutting segments, such as illustrated in FIG. 8, taken along the line 12—12 on FIG. 13;

FIG. 13 is a cross-section taken along the line 13—13 on FIG. 12;

FIG. 14 is an enlarged vertical section through a portion of a pair of abutting wafers or discs used in the mold assembly in FIG. 12;

FIG. 15 is a section taken along the line 15—15 on FIG. 14;

FIG. 16 is an isometric projection of another specific form of cutting segment showing single rows of staggered diamonds on opposite sides of the segment;

FIG. 17 is a top plan view of another specific wafer or disc that can be used in the mold assembly shown in FIG. 12 for appropriately arranging diamonds therein;

FIG. 18 is an enlarged section taken along the line 18—18 on FIG. 17;

FIG. 19 is a vertical section through a stack of wafers or discs shown in FIGS. 17 and 18;

FIG. 20 is a plan view of another wafer or disc and screen for securing diamond distribution in a diamond impregnating cutting segment;

FIG. 21 is an enlarged top plan view of the groove portion of the wafer or disc shown in FIG. 20;

FIG. 22 is an enlarged section taken along the line 22—22 on FIG. 21.

Figure 4:
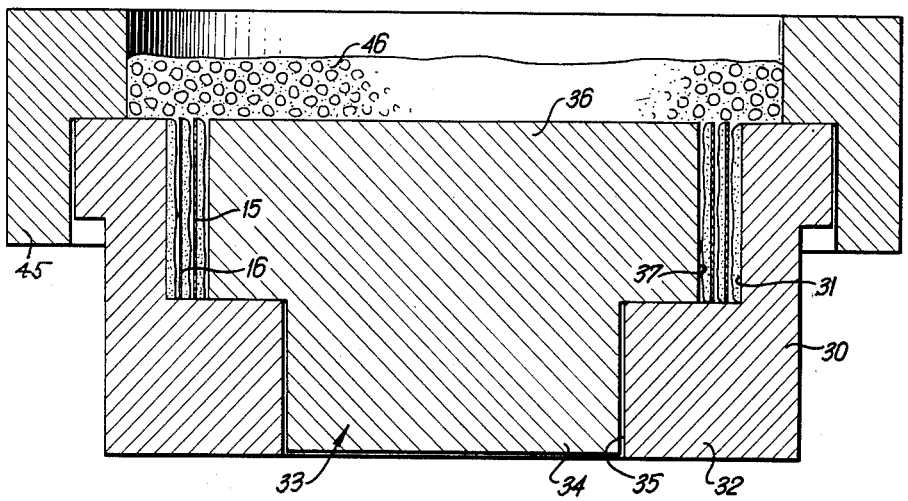
FIG. 4 is a longitudinal section through a mold in which the crown portion of the bit shown in FIGS. 1 to 3 is made.

The cutting device illustrated in FIGS. 1, 2 and 3 can be used specifically for cutting concrete, or for producing a core in other material. It includes an annular bit crown 10, the upper end of which is suitably secured, as by brazing, to a rotatable cylindrical support or shank 11. The bit crown consists of a plurality of rings 12, 13, 14 of diamond abrasive material, such as diamonds impregnated in a matrix of tungsten carbide, or the like. As shown, an inner diamond impregnated matrix ring 12, an intermediate matrix ring 13 and an outer matrix ring 14 are provided. The inner and intermediate rings 12, 13 are separated by a reinforcing ring or sleeve of steel 15, or similar material, whereas, the intermediate abrasive ring 13 and the outer abrasive ring 14 are separated by an outer reinforcing ring 16 of steel, or corresponding material.

The abrasive rings 12, 13, 14 have diamonds 17 embedded therein throughout their length, extending upwardly from the lower end faces of the rings, which end faces may all lie in the same plane normal to the axis of the bit crown 10 and the shank 11. The steel reinforcing rings or sleeves 15, 16 may also extend along substantially the entire length of the bit crown 10, and may also extend to the lower end face of the bit crown. However, these reinforcing rings or sleeves may terminate slightly above the lower end faces of the diamond impregnated matrix rings 12, 13, 14 to provide circumferential grooves 18 between the inner, intermediate and outer abrasive rings.

In the operation of the cutting device shown in FIGS. 1, 2 and 3 upon concrete C, or similar material, the bit crown forms a circumferential groove 19 in the concrete, the diamonds 17 cutting away the material, which is removed from the cutting region by use of a suitable flushing fluid, such as water. During the cutting action, circumferential ribs 20 of concrete are formed in the bottom of the groove 19 which will project upwardly between the inner, intermediate and outer diamond impregnated rings 12, 13, 14. The bit crown 10 is ordinarily comparatively thin, so that such ribs 20 resist their lateral deflection, preventing their cracking and breaking. If the reinforcing rings 15, 16 are initially extended downwardly to the lower end of the bit crown 10, the concrete or other work being produced erodes such rings away to provide the circumferential end grooves 18 between the diamond abrasive rings.

The circumferential ribs 20 produced in the bottom of the concrete groove 19 will not impede progress of the bit through the work C, since such ribs, being of frangible material, readily break away and are carried from the cutting region by the flushing fluid. These rib portions 20 are continuously formed during the cutting action, since the grooves 18 between the diamond abrasive rings will always be present, despite the fact that the diamond rings 12, 13, 14 will also wear away axially. The reinforcing rings 15, 16 therebetween erode or wear away more readily than the diamond impregnated rings.

The diamonds 17 are arranged in an appropriate pattern throughout the entire length of the matrix rings, so as to distribute substantially uniformly the load around the entire circumference of the bit face. As the lower bit face wears away, other diamonds 17 along the length of the matrix rings are progressively exposed, so that the cutting device has a long effective useful life in cutting upon concrete C, or other materials.

As shown most clearly in FIGS. 2 and 3, each matrix ring 12, 13, 14 has inner and outer sets of diamonds 21, 22 embedded therein, these diamonds extending along the length of each ring. The set of diamonds 22 extending inwardly from the outer face of a ring includes longitudinal rows of diamonds 23 that are intermittently disposed around the circumference of the ring, the rows being spaced from one another by matrix material 24. Each longitudinal row 23 may have an arcuate extent of one diamond or an arcuate extent of a plurality of diamonds, as specifically illustrated in FIG. 3. The diamonds 25 extending inwardly from the inner face of each matrix ring are also arranged in rows extending longitudinally of the matrix ring, the longitudinal rows 25 being spaced from one another, being separated by matrix material 24. The spacing between the longitudinal rows of diamonds may be substantially equal to or greater than the arcuate extent of each longitudinal row of diamonds 23, 25, and the inner set 21 of diamonds or stones are alternately arranged with respect to the outer set 22, as shown in FIG. 3, such that the rows of diamonds 25 in one set are in staggered relation to the row of diamonds 23 in the other set. The size of the stones or diamonds employed is also preferably such that the sets 21, 22 of diamonds slightly overlap one another transversely of the matrix ring.

In the specific cutting device shown in FIGS. 1, 2 and 3, six sets 22, 21, 26, 27, 28, 29 of diamonds are disclosed extending circumferentially around the matrix rings 12, 13, 14, each set of diamonds including longitudinally extending rows 23 or 25 arcuately spaced from one another, with the rows 23 of one set being staggered with respect to the rows 25 of the adjacent set and, as has been pointed out above, with the sets of diamonds in each matrix ring preferably overlapping one another. Such overlapping, while preferred, is not indispensible to the provision of an impregnated type of diamond cutting device. The set of diamonds in one matrix ring is staggered with respect to the adjacent set of diamonds in the adjacent matrix ring, as shown. Thus, there are six sets of diamonds extending circumferentially around the bit, as shown in FIG. 3. The first, third and fifth sets 22, 26, 28 may have longitudinally extending rows 23 overlying one another, whereas the second, fourth and sixth sets 21, 27, 29 have their longitudinally extending rows 25 of diamonds or stones also overlying one another, but arcuately displaced from the rows 23 in the first, third and fifth sets of diamonds.

The diamonds in each matrix ring are disposed closely adjacent to the faces of each ring, as shown. The fifth set 28 of diamonds is adjacent to the inner reinforcing ring 15, which is also true of the diamonds of the fourth set 27. The diamonds of the third set 26 are adjacent to the outer reinforcing ring 16, which is also true of the diamonds in the second set 21. The first set 22 of diamonds are at the outer face of the outer matrix ring 14, whereas the diamonds of the sixth set are adjacent to the inner face of the inner matrix ring 12.

By virtue of the provision of an impregnated diamond type of cutting device, such as shown in FIGS. 1, 2 and 3, with the diamonds arranged in predetermined patterns, the bit has a long cutting life, with assurance that the diamonds 17 are at the appropriate location. Diamonds or stones are available for cutting upon the entire area of the bottom of the groove 19 in the concrete C, or other work, with the exception of the regions traversed by the reinforcing rings 15, 16 of steel, which, however, do not interfere with the cutting rate of the bit, since the ribs 20 formed in the bottom of the concrete break off readily. As noted above, the ribs have a stabilizing effect, minimizing lateral flexure of the matrix rings 12, 13, 14. In addition, the steel sleeves or rings 15, 16 reinforce the entire crown 10.

The staggering of the sets of the diamonds also provides a cutting device having a long life, capable of cutting at a rapid rate and with a fewer weight of diamonds in the bit crown. Accordingly, a cutting device is provided which can be produced more economically, and yet be capable of performing its cutting action in a rapid manner, while possessing a long life. As the bit crown 10 wears away, additional cutting stones 17 are exposed for continuing the cutting action against the concrete or other work.

Figure 5:
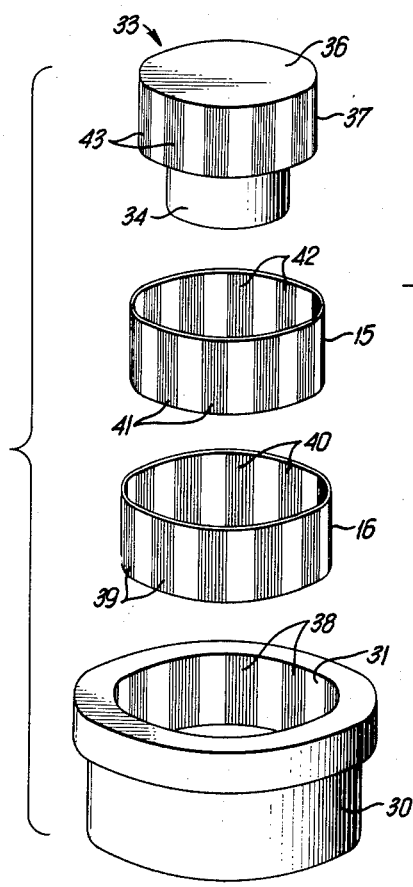
FIG. 5 is an exploded isometric projection of the parts of the crown and of portions of the molding apparatus disclosed in FIG. 4.

The cutting device shown in FIGS. 1, 2 and 3 can be produced in a comparatively rapid manner and at relatively low cost. FIGS. 4 and 5 illustrate an apparatus for producing the bit crown 10 shown in FIGS. 1, 2 and 3. An outer carbon mold 30 is provided having an inner surface or wall 31 conforming to the outside diameter of the bit crown which is desired. This mold also has a bottom wall 32 and is adapted to receive a carbon plug 33, the lower end 34 of which is piloted in a central hole 35 in the bottom of the mold, and the upper end 36 of which is enlarged and rests upon the bottom 32 of the mold. Thus, the plug 33 and mold 30 are coaxial of one another with the outside diameter of the enlarged portion 36 of the plug conforming to the inside diameter of the finished bit crown 10. The bit crown itself is produced between the inner wall 31 of the mold and the periphery 37 of the upper portion 36 of the plug.

The inner wall 31 of the mold is painted or otherwise coated at spaced intervals around its circumference with a slow drying adhesive 38, such as rubber cement, the adhesive coating conforming to the spacing between the rows 23 of diamonds in the first or outermost set 22 of stones in the bit crown. The outer reinforcing ring 16 of the bit crown has its inner and outer surfaces also coated with a slow drying adhesive intermittently around its circumference, with the coated areas 39 of the outer surface of the ring alternating and in staggered relation to the coated areas 40 on the inner surface of the ring 16. Again, the intermittently coated areas 39 on the outer surface of the reinforcing ring 16 conform to the diamond pattern in the second set 21 of diamonds in the bit crown, whereas the coated areas 40 on the inner surface of the reinforcing ring conform to the intermittent diamond pattern of the third row 26 of diamonds of the bit crown. In a similar manner, the inner reinforcing ring 15 has its inner and outer surfaces adhesively coated, the coating on each surface being intermittently applied around the circumference of the ring with the outer intermittent adhesive coatings 41 being staggered with respect to the inner intermittent adhesive coatings 42. The outer intermittent coatings 41 conform to the spacing of the fourth set 27 of diamonds of the bit crown, whereas, the inner intermittent coatings 42 conform to the fifth row 28 of diamonds of the bit crown. Finally, the periphery 37 of the plug has the slow drying adhesive, such as rubber cement, applied at spaced intervals around its entire circumference, the intermittent coated regions 43 conforming to the spacing between the longitudinal rows 25 of the sixth set of diamonds of the bit crown.

Diamonds 17 of the desired size or sizes are then sprinkled or otherwise deposited on the coated tacky surfaces of the carbon mold 30, inner and outer reinforcing rings 15, 16 and the carbon plug 33. Diamonds will adhere to these coated regions, but will not adhere to the intervening uncoated regions, dropping therefrom. The rows 23, 25 of diamonds are, therefore, provided along the entire length of the coated regions on the various intermittently adhesively coated elements.

The mold and parts may now be assembled with respect to one another. The outer ring 16 is placed within the carbon mold 30 with its outer set 21 of diamonds in staggered relation to and between the set 22 of diamonds adhering to the mold wall 31, the outer ring also being appropriately centered relative to the mold. The inner reinforcing ring 15, with the diamonds on its inner and outer faces, is then inserted within the outer ring 16, with its outer set 27 of stones in staggered relation to and between the sets 26 of stones adhering to the inner surface of the outer reinforcing ring 16. The plug 33 is then inserted within the inner ring 15, with the set 29 of stones or diamonds adhering thereto placed in staggered relation to and between the set 28 of stones extending inwardly from the inner reinforcing ring 15. The two rings are coaxial with one another, and with respect to the plug and mold, so that the proper annular spaces are provided between the rings 15, 16 themselves and between the inner ring 15 and the periphery 37 of the plug 33, and between the outer ring 16 and the inner wall 31 of the mold 30.

The matrix material, which might be tungsten or tungsten carbide, for example, of a suitable mesh, is then deposited in the mold 30, passing downwardly between the mold and outer ring 16, between the reinforcing rings 15, 16 themselves, and between the inner ring 15 and the plug 33. A carbon cap 45 is then placed on top of the mold 30 and an appropriate infiltrant or binder 46 of a suitable particle size placed on top of the mold 30, rings 15, 16 and plug 33, as shown in FIG. 4. This infiltrant or binder may be of any desired type, such as copper, a copper alloy, nickel, cast iron, or combinations thereof. The entire mold assembly shown in FIG. 4 is then placed in a furnace at a suitable temperature and for a suitable period. The infiltrant or binder will melt, flowing downwardly into the mold between the plug and inner ring, between the reinforcing rings themselves, and between the outer ring and the outer mold member, serving to bind the tungsten or tungsten carbide particles to one another and causing the latter to flow intimately around all of the stones 17, whereby the latter are embedded within the matrix rings 12, 13, 14 with the matrix rings themselves being attached to the reinforcing rings or sleeves 15, 16. During the furnacing operation, all vapors attributed to the binder material pass off.

The mold assembly is removed from the furnace. Upon cooling, the bit crown 10 is removed from the mold, and can then be brazed, or otherwise suitably attached, to the rotatable cylindrical support or shank 11.

The cutting device disclosed in FIGS. 6 and 7 is a rotatable cutting wheel or saw 48 adapted to cut concrete, brick, and the like. The wheel includes a main central support or disc 49, which may be made of steel or other suitable material, having a central arbor hole 50 for mounting the wheel on a suitable rotating mechanism (not shown). The disc or support has a plurality of radial slots 51 extending inwardly from its periphery to provide lands 52 on which cutting segments 53 are mounted. As disclosed, two rows 54, 55 of segments are disposed around the peripheral portion of the disc, one row 54 being on one side of the disc and the other row 55 of segments being disposed on the other side of the disc. Each segment 53 is composed of a metallic matrix 56, such as tungsten or tungsten carbide of a suitable mesh, impregnated with diamonds 57 of a proper mesh. These segments are attached to the central support or disc 49 by a brazing operation, such as by silver soldering.

It is to be noted that each row of segments 54, 55 is disposed in an arcuate recess 58 extending along each land 52. In fact, each row of segments may be considered as being disposed in a circumferential recess 58 provided at the peripheral portion of the wheel, each recess extending inwardly to a substantial extent from a side face 59 of the disc toward a central plane of the disc, leaving a central reinforcing supporting or stabilizing rib 60 between the recesses 58, 58 which runs around the entire circumference of the wheel or disc, except where interrupted by the radial slots 51.

Each segment 53 is disposed on a land 52 and in a recess 58, the inner side surface 61 of the segment engaging the side of the rib 60 which defines the inner side of the recess, and the arcuate inner surface 62 of the segment engaging the bottom of the recess from which the rib 60 extends. Each cutting segment 53 preferably extends laterally outwardly beyond the side 59 of the central supporting member or disc 49, so as to insure the cutting of adequate clearance for the disc during the cutting operation in the work which, may be concrete. The outer surfaces or peripheries of the rows 54, 55 of cutting segments have substantially the same radius from the axis of the disc 49, and may extend radially outwardly beyond the periphery of the central supporting rib 60, or at least will extend radially outwardly as far as the periphery of the central supporting rib.

Each segment 53 is brazed to the central support or wheel 49 along the side of the recess 58 in which it is mounted, and also along the bottom of the recess, which provides a very large surface or area for bonding each segment to the wheel. As a result, a very strong bond is provided, insuring against the breaking off or dislodgement of a segment 53 from the wheel, even under hard usage of the cutting device.

As stated, each of the cutting segments 53 is of the impregnated type. It is desired to have a definite pattern of diamonds in each cutting segment. Thus, as shown in FIG. 8, a set 64 of diamonds 57 extends inwardly from one face of the cutting segment, and another set 65 extends inwardly from the opposite face of the cutting segment. Each set of diamonds consists of spaced rows 66 or 67 that are separated from one another by matrix material 56, the diamonds 57 in each row being longitudinally arranged from the outer surface 68 of the segment to its inner surface 62. The rows of diamonds of one set 64 are staggered or offset with respect to the rows of diamonds of the other set 65 and may overlap the central plane of the segment, such as shown in FIG. 8. The diamonds 57 are embedded in the matrix 56, which may be tungsten or tungsten carbide and a binder metal. Each row 66 or 67 may consist of a single line of diamonds, such as disclosed in FIG. 16, or a plurality of adjacent lines of diamonds, such as disclosed in FIG. 15. In FIG. 8, individual diamonds or stones are not represented, but only areas or regions where the diamond rows 66, 67 are located.

With the proper distribution of diamonds throughout each segment 63, and particularly where sets 64, 65 of rows overlap one another, assurance is had that diamonds or stones are available for operation upon the concrete, or other work, over substantially the full area of contact of the segment with the work. The diamonds are appropriately or uniformly distributed through the matrix 56, rather than the matrix having clusters of diamonds embedded therein and being devoid of diamonds at other portions. As each segment 53 wears away, additional diamonds, appropriately spaced from one another throughout the matrix 56, are exposed for action upon the work.

FIGS. 9 to 15, inclusive, illustrate a mold arrangement that can produce the cutting segments shown in FIGS. 8 and 16. The mold assembly shown in FIG. 12 can produce a plurality of such segments in a single furnacing operation. Superimposed carbon discs or wafers 70 are mounted upon one another, the discs or wafers having opposed mating grooves 71, 72 that conform in shape and size to the each cutting segment 53 desired. Thus, each disc 70 will have one or a plurality of arcuate grooves 71 in its upper portion, and also similar arcuate grooves 72 extending upwardly from its lower face. The grooves 71, 72 of the wafers are alike and will be aligned with one another when placed in stacked relation, as disclosed in FIG. 12. The bottom of an upwardly facing groove 71 is coated with a suitable slow drying adhesive, such as rubber cement, at intervals 73, each interval 73 being of a desired width, depending upon the width of diamonds in each row 67, there being uncoated spaces 74 in the bottom of the groove 71 substantially equalling that of the adhesively coated portions 73 of the groove base. The downwardly facing groove 72 of the wafer or disc thereabove is coated along alternate regions 75 with respect to the groove 71 therebelow; that is, the portion 75 of the downwardly facing groove which will be opposite an uncoated portion 74 of the lower groove 71 is adhesively coated, leaving uncoated areas 76 which will be opposite adhesively coated areas 73 in the opposite groove 71, such that when the wafers 70 are placed one upon one another, the coated areas 75 of the lower groove 72 will be in staggered relation to the coated areas 73 of the upper groove 71.

Diamonds of preselected size or sizes are sprinkled into the grooves 71 of a wafer 70 with the adhesive coating still in a tacky state, and the non-adhering diamonds or stones are shaken off, thereby providing alternate rows, such as 66, of diamonds in the grooves 71. Similarly, diamonds of a preselected size or sizes are sprinkled into the grooves 72 on the other side of the wafer and the non-adhering diamonds or stones shaken off. The same procedure is followed for all of the grooved and intermittently adhesively coated wafers.

The matrix 56 in a plastic or paste-like state is then spread into each groove and scraped level. The plastic matrix material may be tungsten or tunsten carbide of a suitable mesh, which is mixed with a suitable paste, such as glycerine, or the like. Where the diamonds of one row 67 are to overlap the diamonds of the other row 66, it may be desirable to place the matrix in the upwardly facing groove 71 only, so that the diamonds depending from the disc thereabove can project into the matrix in the upwardly facing groove therebelow. However, the downwardly facing groove 72 with diamonds therein may also be partially filled with matrix in the paste-like state, in the same manner as the upwardly facing groove.

The superimposed discs 70, which may be made of carbon, are then placed in a sleeve 80 and this assembly (FIGS. 12, 13), inserted within an encompassing retainer 81 resting upon a mold base 82 engaged by the lowermost disc 70. The wafers 70 have grooves 83 at the periphery thereof which oppose a companion groove 84 in the inner wall of the sleeve 80. An appropriate index pin 85 can be inserted in the aligned grooves 83, 84, which will insure that the wafers 70 are appropriately aligned, with the downwardly facing grooves 72 opposite and in registry with the upwardly facing grooves 71. The ends of the grooves 71, 72 themselves will also communicate with vertically extending filler holes 86 running along the entire length of the sleeve 80, these filler holes communicating with aligned holes 87 in a cap or funnel 88 disposed in the upper portion of the retainer 81 and resting upon the uppermost wafer 70 in the upper end of the sleeve. Additional matrix powder 56 is then pressed down into the feed holes 86, passing through the inner portions 89 of such holes that open into the aligned grooves 71, 72.

A metallic binder or infiltrant 90 is then placed in the upper portion of the cap or funnel 88. The completed mold assembly, such as disclosed in FIG. 12, is now preheated in order to dry it completely, the liquid used in making the matrix paste being driven off. After all the liquids and vapors have been removed by the preheating operation, the mold assembly is placed in a furnace and heated to the appropriate temperature for a suitable period of time. The metallic binder 90, which may be of any suitable type, such as copper or copper alloy, nickel, cast iron, and the like, will melt and will flow down through the feed holes 86 and into the grooves 71, 72, infiltrating into the matrix material 56 in each groove, the binder saturating the entire matrix, the matrix with the binder admixed thereto flowing around all of the diamonds or stones 57 in each groove. After the heating has occurred for an appropriate time, which, for example, may be about twenty minutes at the proper melting temperature for the metallic binder, the mold assembly is taken from the furnace and allowed to cool naturally in the air. After cooling, the mold is disassembled and the finished inserts 53 extracted from the grooves 71, 72. They may then be sand blasted for the purpose of cleaning before being brazed onto the steel discs 49.

As shown in FIG. 15, the bases of the grooves are coated along their entire width, so that each row can carry stones three abreast. This number can be varied. For example, if the adhesively coated region 73 or 75 for each row is relatively narrow, then only a single row of stones will adhere thereto, resulting in the production of the cutting segment 53 disclosed in FIG. 16. By virtue of the method illustrated, a large number of segments can be formed with facility, with assurance that the stones will be distributed through each segment in the desired pattern, extending from the inner end 62 to the outer end 68 of each segment and with the rows 66, 67 of stones appropriately spaced from one another along the length of the segment, one set 64 of stones being in staggered relation to the other set 65 of stones, and, if stones of sufficient size are used, one set 64 overlying the other set at least to a slight extent, thereby insuring that the segment will have diamonds capable of cutting over the entire area of the work engaged by the segment.

In FIGS. 17, 18 and 19, the carbon wafers or discs 70a are so arranged as to insure the proper location of stones 57 in each row. As shown, the bottom or base of each groove 71, 72 in the wafer has relatively shallow locating grooves 100 therein extending across the width of the base. These locating grooves 100 are appropriately spaced from one another. After having been formed, an adhesive coating is applied thereto so that the stones 57 will adhere to the locating grooves 100 only, when sprinkled in the groove, the excess stones being shaken from the disc, leaving the stones or diamonds 57 arranged in a pattern such as shown in FIG. 17. The same locating groove arrangement can be used in the lower groove 72 in a disc, the locating grooves being in staggered relation to the upper set of grooves. The segment is then made in the same manner as described above, as by spreading a matrix in a plastic or paste-like state in each groove 71, 72 to fill the same. If desired, the stones can be of a size so that an upper set 64 will slightly overlap a lower set 65, such as disclosed in FIG. 16. The same mold assembly can be used with the locating groove arrangement 100, as shown in FIG. 12, and the plurality of cutting segments 53 formed by use of a suitable metallic binder or infiltrant.

In FIGS. 20, 21 and 22, a substantially uniform distribution of diamonds or stones can be achieved in each groove in a comparatively easy manner. A wire screen 110 conforming to the shape of a groove, and of a suitable mesh, is inserted in each groove and diamonds or stones 57 of a suitable mesh, so as to pass through the screen, then deposited upon the screen when it is in the groove. The base of each groove is adhesively coated so that the stones 57 will adhere thereto. After substantially all of the interstices in the screen have been filled with diamonds or stones, the screen is lifted from the groove, leaving the diamonds adherent to its bottom in a fairly uniform pattern therealong. The same operation will then occur in the other groove of the disc 70, after which the discs are stacked upon one another, appropriately oriented by means of the index pin 85 and placed in the mold assembly, whereupon the finished inserts 53 are made in the same manner as described in connection with FIGS. 12 to 15.

With the use of the screen 110 in securing the diamond distribution, the stones 57 placed in the lower grooves 72 will be of a size so as not to overlap the stones in the opposed upper grooves 71 of the adjacent disc. The segment 53 resulting from the use of the screen method will have diamonds or stones substantially uniformly distributed throughout the entire matrix, assurance thereby being had that there is no clustering of diamonds, and matrix regions that are devoid of diamonds.

From the foregoing description, it is apparent that diamonds are distributed in the matrices in appropriate desired patterns, clustering of diamonds being avoided. Impregnated types of diamond cutting devices are therefore provided which will have a long cutting life, inasmuch as diamonds are progressively exposed along the entire cutting face of the matrix members in which the diamond elements are embedded. The appropriate distribution of diamonds permits covering of the entire surface of the work being cut with a fewer number of diamonds, thereby effecting economies, while life of the resulting cutting device is comparatively long. By use of the methods described for producing the cutting devices, appropriate or uniform distribution of diamonds throughout the matrix is assured, production being obtained in a comparatively rapid and economical manner.

I claim:

1. In a cutting device: a matrix having side faces; cutting elements embedded in said matrix, said cutting elements being arranged in sets adjacent to said side faces which are generally parallel to one another, each set including straight rows of cutting elements adjacent to a side face generally parallel to one another.

2. In a cutting device: a matrix having side faces; cutting elements embedded in said matrix, said cutting elements being arranged in sets adjacent to said side faces which are generally parallel to one another, each set including straight rows of cutting elements adjacent to a side face generally parallel to one another, the rows of each set being spaced substantially from each other.

3. In a cutting device: a matrix having side faces; cutting elements embedded in said matrix, said cutting elements being arranged in sets adjacent to said side faces which are generally parallel to one another, each set including straight rows of cutting elements adjacent to a side face generally parallel to one another, the rows of each set being spaced substantially from each other, the rows of one set at one side face of said matrix being staggered with respect to the rows of an adjacent set at the opposite side face of said matrix.

4. In a cutting device: a matrix having side faces; cutting elements embedded in said matrix, said cutting elements being arranged in sets adjacent to said side faces which are generally parallel to one another, each set including straight rows of cutting elements adjacent to a side face generally parallel to one another, the rows of each set being spaced substantially from each other, the rows of one set at one side face of said matrix being staggered with respect to the rows of an adjacent set at the opposite side face of said matrix and partially overlying the rows of said adjacent set.

5. In a cutting device for a cutting wheel: a matrix segment having side faces; cutting elements embedded in said matrix segment, said cutting elements being arranged in sets adjacent to the side faces of said segment, said sets being generally parallel to one another, each set including straight rows of cutting elements adjacent to a side face generally parallel to one another.

6. In a cutting device for a cutting wheel: a matrix segment having side faces; cutting elements embedded in said matrix segment, said cutting elements being arranged in sets adjacent to the side faces of said segment, said sets being generally parallel to one another, each set including straight rows of cutting elements adjacent to a side face generally parallel to one another, the rows of each set being spaced substantially from each other.

7. In a cutting device for a cutting wheel: a matrix segment having side faces; cutting elements embedded in said matrix segment, said cutting elements being arranged in sets adjacent to the side faces of said segment, said sets being generally parallel to one another, each set including straight rows of cutting elements adjacent to a side face generally parallel to one another, the rows of each set being spaced substantially from each other, the rows of one set at one side face of said segment being staggered with respect to the rows of an adjacent set at the opposite side face of said segment.

8. In a cutting device for a cutting wheel: a matrix segment having side faces; cutting elements embedded in said matrix segment, said cutting elements being arranged in sets adjacent to the side faces of said segment, said sets being generally parallel to one another, each set including straight rows of cutting elements adjacent to a side face generally parallel to one another, the rows of each set being spaced substantially from each other, the rows of one set at one side face of said segment being staggered with respect to the rows of an adjacent set at the opposite side face of said segment and partially overlying the rows of said adjacent set.

9. In a cutting device: a matrix member curved about the axis of the device; cutting elements embedded in said matrix; said cutting elements being arranged in sets curved about the axis of the device and substantially parallel to one another, each set including longitudinally extending rows of cutting elements substantially parallel to one another.

10. In a cutting device: a generally cylindrical matrix member having inner and outer side surfaces; cutting elements embedded in said matrix member; said cutting elements being arranged in sets adjacent to the inner and outer side faces of said matrix member, each set including longitudinally extending rows of cutting elements substantially parallel to one another, the rows of each set being spaced substantially from each other.

11. In a cutting device: a generally cylindrical matrix member having inner and outer side surfaces; cutting elements embedded in said matrix member; said cutting elements being arranged in sets adjacent to the inner and outer side faces of said matrix member, each set including longitudinally extending rows of cutting elements substantially parallel to one another, the rows of each set being spaced substantially from each other, the rows of one set being staggered with respect to the rows of an adjacent set.

12. In a cutting device: a generally cylindrical matrix member having inner and outer side surfaces; cutting elements embedded in said matrix member; said cutting elements being arranged in sets adjacent to the inner and outer side faces of said matrix member, each set including longitudinally extending rows of cutting elements substantially parallel to one another, the rows of each set being spaced substantially from each other, the rows of one set being staggered wtih respect to the rows of an adjacent set and partially overlying the rows of said adjacent set.

13. In a cutting device: inner and outer generally cylindrical matrix sleeves; a generally cylindrical reinforcing sleeve between and secured to said matrix sleeves; cutting elements embedded in said matrix sleeves; said cutting elements being arranged in sets adjacent to the inner and outer side faces of said matrix sleeves, each set including longitudinally extending rows of cutting elements substantially parallel to one another.

14. In a cutting device: inner and outer generally cylindrical matrix sleeves; a generally cylindrical reinforcing sleeve between and secured to said matrix sleeves; cutting elements embedded in said matrix sleeves; said cutting elements being arranged in sets adjacent to the inner and outer side faces of said matrix sleeves, each set including longitudinally extending rows of cutting elements substantially parallel to one another, the rows of each set being spaced substantially from each other, the rows of one set in each matrix sleeve being staggered with respect to the rows of an adjacent set in said matrix sleeve.

15. In a cutting device: inner and outer generally cylindrical matrix sleeves: a generally cylindrical reinforming sleeve between and secured to said matrix sleeves; cutting elements embedded in said matrix sleeves; said cutting elements being arranged in sets adjacent to the inner and outer side faces of said matrix sleeves, each set including longitudinally extending rows of cutting elements substantially parallel to one another, the rows of each set being spaced substantially from each other, the rows of one set in each matrix sleeve being staggered with respect to the rows of an adjacent set in said matrix sleeve and partially overlying the rows of said adjacent set in said matrix sleeve.

16. In a cutting device: inner and outer generally cylindrical matrix sleeves; a generally cylindrical reinforcing sleeve between and secured to said matrix sleeves; cutting elements embedded in said matrix sleeves; said cutting elements being arranged in sets adjacent to the inner and outer side faces of said matrix sleeves, each set including longitudinally extending rows of cutting elements substantially parallel to one another, the rows of each set being spaced substantially from each other, the rows of one set in each matrix sleeve being staggered with respect to the rows of an adjacent set in said matrix sleeve and partially overlying the rows of said adjacent set in said matrix sleeve, the rows at the outer side face of the inner matrix sleeve being staggered with respect to the rows at the inner side face of the outer matrix sleeve.

References Cited in the file of this patent

UNITED STATES PATENTS

| | | |
|---|---|---|
| 1,097,565 | Straubel | May 19, 1914 |
| 1,488,912 | Foerster | Apr. 1, 1924 |
| 1,939,991 | Krusell | Dec. 19, 1933 |
| 2,014,955 | Taylor | Sept. 17, 1935 |
| 2,225,193 | Benner et al. | Dec. 17, 1940 |
| 2,361,492 | Pare | Oct. 31, 1944 |
| 2,495,400 | Williams | Jan. 24, 1950 |
| 2,545,676 | Small | Mar. 20, 1951 |
| 2,705,194 | St. Clair | Mar. 29, 1955 |
| 2,815,746 | Schwarzkopf et al. | Dec. 10, 1957 |
| 2,833,520 | Owen | May 6, 1958 |
| 2,921,485 | Small | Jan. 19, 1960 |
| 2,978,847 | Shoenmakers | Apr. 11, 1961 |
| 3,028,710 | Pratt | Apr. 10, 1962 |